March 28, 1939. N. H. GAY 2,152,250
CONTINUOUS CYCLE HEATING AND COOLING SYSTEM
Filed Sept. 3, 1935 4 Sheets-Sheet 2
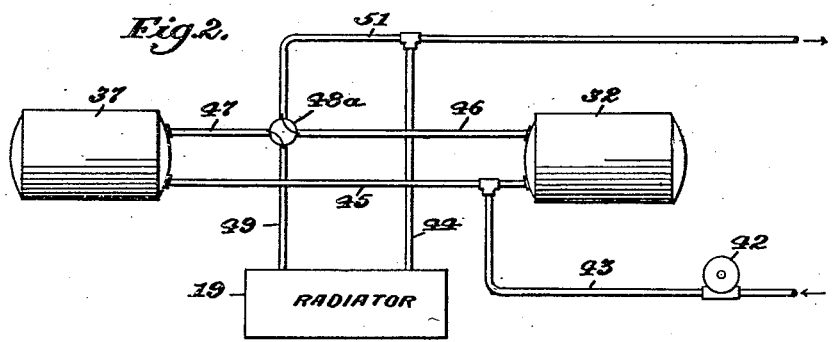
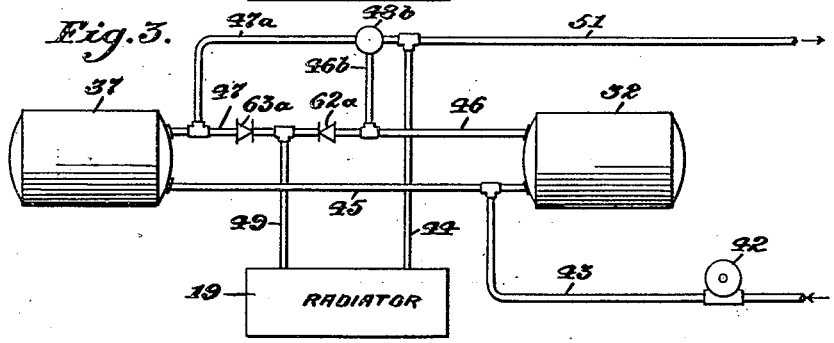
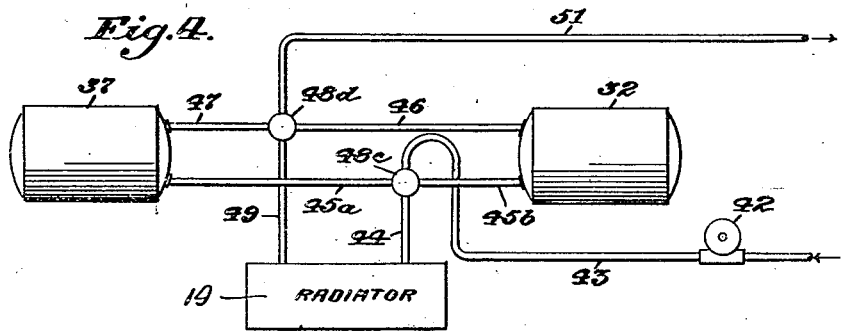
Inventor:
Norman H. Gay,
by [signature]
Att'ys.

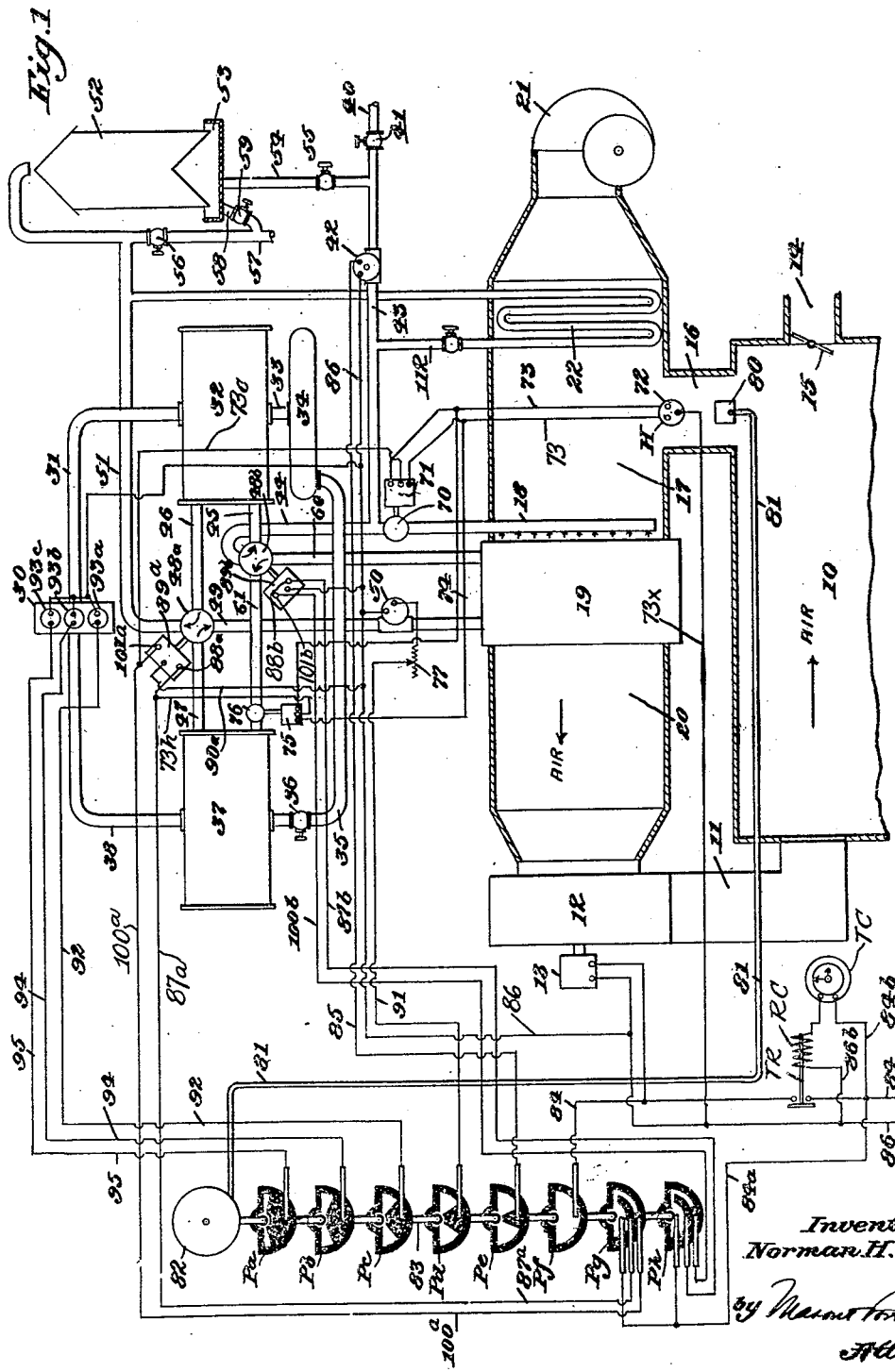

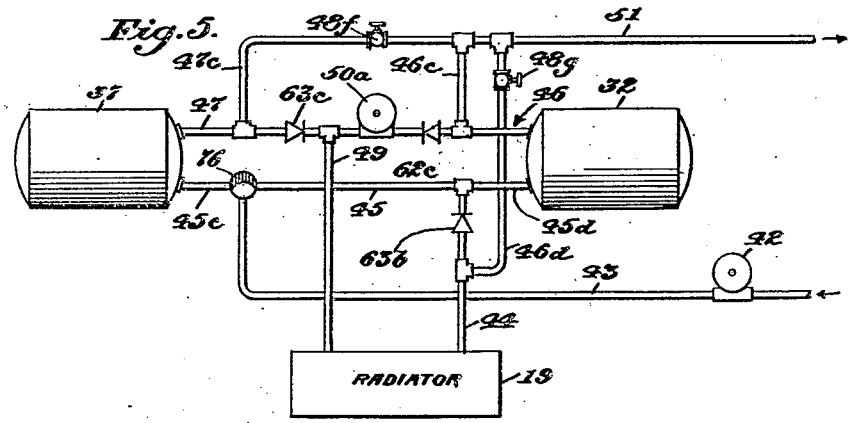
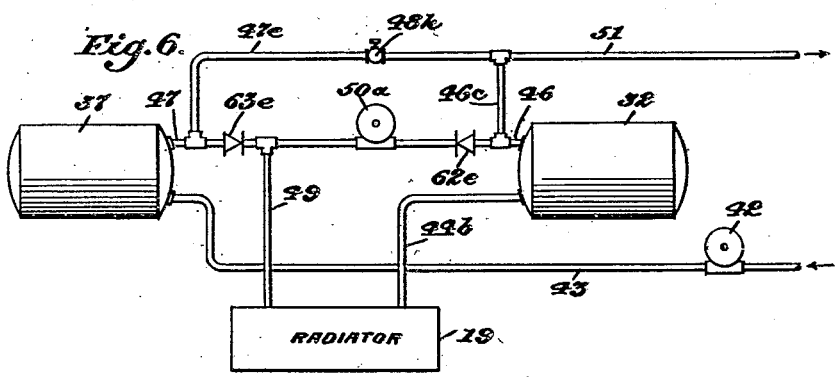
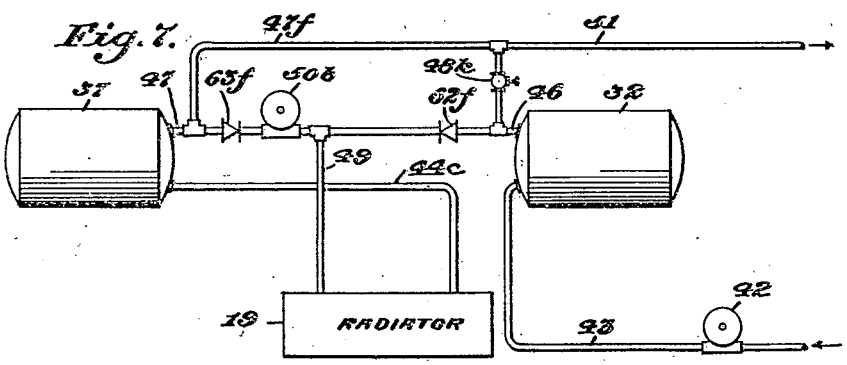

March 28, 1939.  N. H. GAY  2,152,250
CONTINUOUS CYCLE HEATING AND COOLING SYSTEM
Filed Sept. 3, 1935  4 Sheets-Sheet 4

Inventor:
Norman H. Gay,
by Munn
Att'ys.

Patented Mar. 28, 1939

2,152,250

UNITED STATES PATENT OFFICE 2,152,250

CONTINUOUS CYCLE HEATING AND COOLING SYSTEM

Norman H. Gay, Los Angeles, Calif.

Application September 3, 1935, Serial No. 39,064

22 Claims. (Cl. 62—129)

This invention relates to improvements in heating and cooling systems, and is more particularly related to such a system in which the evaporator and condenser of a refrigerating plant are employed alternatively for producing cooling or heating effects which are transmitted to the space to be cooled or heated.

One feature of the present invention is the utilization of such a system for producing selective heating and cooling effects according to the requirements in the space to be heated or cooled, with the employment of a simple arrangement of radiator or heat exchanger operating in conjunction with the condenser and evaporator so that the radiator is provided with a hotter or colder medium according to the demands of the space itself.

Another feature of the present invention is the provision of means for conditioning the air in a space by circulating it past a radiator which is selectively supplied with a medium which is hotter or colder than the air according to the demands of the space, the heating or cooling being controlled by the selective passage of the medium past a condenser or an evaporator of a refrigerating plant immediately prior to the passage of such medium into the radiator.

A further feature of the present invention is the provision of such a system in association with automatic control devices which selectively operate according to the demands of the space for effecting a heating or cooling thereof, and for controlling the rate at which the heating or cooling effect is attained.

Still another feature of the present invention is the provision of means for selectively heating or cooling the air in such a space or in an apartment, by utilization of the heating effect at the condenser of a refrigerating plant, the cooling effect at the evaporator in such a plant, or in association with a radiator and humidifying means, and a supply of water for serving a preliminary tempering element, a humidifying device, and the system comprising the evaporator and condenser.

A still further feature of the present invention is the provision of a cooling and heating plant by which the natural temperature condition of water and/or its condition as delivered from a cooling tower or like structure, is utilized for producing heating or cooling of the air in such a space or apartment.

A particular feature of the invention is the provision of a radiator for modifying the temperature of the air, heating and cooling means for changing the temperature of a circulating medium supplied to the radiator, in conjunction with inlet and outlet connections for the circulating medium, and the provision of valves and conduits by which the circulating medium is caused always to move in the same direction through the individual elements comprising the radiator, heater, and cooler.

A further specific feature of the construction is the provision of a refrigerating plant including a condenser and an evaporator joined in circuit with a compressor to provide a continuous path for the movement of refrigerant, in association with a radiator exposed to the air for the apartment and connected with the evaporator and condenser so that selective cooling and heating effects may be produced at the radiator, together with pipe and valving means by which a continuous path of circulation is set up through the radiator and either the evaporator or condenser.

With these and other features as objects in view, illustrative forms of practicing the present invention are shown diagrammatically in the accompanying drawings in which:

Fig. 1 is a diagrammatic view of a preferred embodiment of the invention.

Figs. 2 to 7 inclusive each show modified forms of providing a conduit system connecting the radiator, condenser, evaporator and cooling tower or waste system of Fig. 1.

Figure 9:
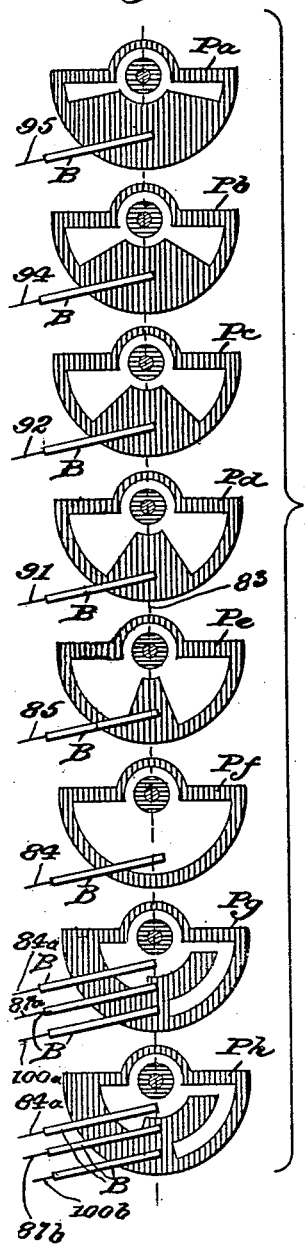
Fig. 9 shows the type of conductor and insulator plates which are employed with the thermostat device of Fig. 8.

In Fig. 1, the space 10 which is to be controlled in temperature is illustrated as an apartment whose atmosphere is to be heated or cooled according to the requirements thereof. Air is introduced to this apartment through a duct 11 by means of a fan 12 which is driven by a motor 13. The air escapes from the apartment by a waste duct 14 under control of a damper 15, or through a recirculation duct 16 leading into the antechamber 17 of the air conditioning plant. This antechamber delivers the air past the humidifying spray device 18 and the radiator 19 into the outlet chamber 20 from which it is drawn by the fan 12 for recirculation into the apartment 10. The air which is wasted through duct 14 is replaced by fresh air introduced by a fresh air fan 21, so that it is passed over the preconditioning coil 22 and thus into the antechamber 17.

The refrigerating plant proper comprises a variable compressor 30 which delivers hot compressed refrigerant gas through a conduit 31 into a condenser 32, from which the hot liquefied refrigerant passes by a conduit 33 into a receiver 34. The liquid refrigerant passes from the receiver 34 by a conduit 35 to an expansion valve 36 and thus into the evaporator 37. The gas developed at the expansion valve 36 and in the evaporator 37 is drawn off through the gas return conduit 38 to the compressor 30. These devices constitute a simple illustrative type of refrigerating plant in which heat is picked up at the evaporator 37 and dissipated at the condenser 32.

The water supply is initially obtained from a main 40 through a controlling valve 41 and thence is forced by a motor driven pump 42 to a supply conduit 43 and thus is delivered through fourway valve 48b (which is also in communication with return pipe 60 from radiator 19) to the water chambers of the condenser 32 or evaporator 37 by branch pipes 45 and 61. The outlet conduits 46, 47 of the condenser 32 and evaporator 37 lead to a four-way valve 48a which also is in communication with the supply pipe 49 leading to radiator 19 through a motor driven pump 50, and with the pipe 51 which leads to the cooling tower 52 having the sump 53 so that the water may pass back into the cycle through the discharge conduit 54 of this sump, under control of the valve 55, and thus to the pump 42 for recycling. Also, the water from the pipe 51 may pass through control valve 56 to the waste 57. A discharge pipe 58 and valve 59 permit evacuation of the sump 53 if desired.

Humidification of the air passing from antechamber 17 to discharge chamber 20, through the radiator 19, when heating, is controlled by means of the spray device 18 under control of a valve 70 which may be opened or closed by the conventionally shown electromagnetic structure 71 under control of the hygrostatic device 72 by the conductors 73. Control of the humidity of the cycling air, when cooling, is attained from the hygrostatic device 72 by conductors 74 leading to the electromagnetic structure 75 for partially closing or opening the valve 76 in conduit 61. This latter humidity control functions by reducing the quantity of water which passes through the evaporator, so that the evaporator cools the water to a lower temperature and a greater initial cooling of the radiator 19 is attained and thus a greater relative dehumidification is effected before the air enters the discharge chamber 20. Hence, the closing of the valve 76 has the opposite result from the opening of the valve 70 to produce a spray of water into the air. It is obvious that a regulation of the pump 50 as by a speed controlling device 77 may be employed similarly for controlling the quantity of water passed to the radiator 19 during the cooling phase, as a means of controlling humidity of the cycling air.

In the form shown in Fig. 1, an automatic control of both temperature and humidity is attained. For this purpose the thermostat device 80 is illustratively connected by a conduit 81 with a thermostatic contact relay actuator 82 (illustrated as a Bourdon tube) for rocking the shaft 83 of this thermostatic contact structure which is shown in detail in Figs. 8 and 9 and described hereinafter, and is conventionally illustrated in Fig. 1 as operating to control a plurality of circuit connections. When the temperature of the air moving past the thermostatic device 80 is normal, no contacts are made at the thermostatic contact device, in the illustrated form. A relative clockwise movement of the shaft 83 is occasioned when the temperature at the device 80 becomes hotter, and a counterclockwise movement when the temperature becomes cooler. A movement in either direction will cause current to flow from a conductor 84 to conductor 85, by means of the contacts illustrated in Figs. 8 and 9 and described hereinafter, whereby to energize the motor driven pump 42, with a return flow of current by a conductor 86 back to the source. This causes water to move from the supply 40 or the cooling tower 52 through the apparatus, including the radiator 19. At the same time or prior to the time that the contacts are made for delivering current to conductor 85, contacts will also have been made from branch conductor 84a to conductor 100a and 100b and thus to the terminals 101a and 100b of the electrically operated device 89a and 89b and thus effects a movement of the fourway valves 48a and 48b for producing a circuit of flow for cold water from pump 42 by conduits 43 and 44, valve 48b, conduit 45, condenser 32, conduit 49, idling pump 50, radiator 19, conduits 60, 61, evaporator 37, conduits 47 and 51 to cooling tower or to waste.

It will be noted that at the time of setting up the "cooling" contacts, a circuit is also established from the charged conductor 100a by branch conductor 73c to the valve controlling device 71, so that this valve control device operates properly under the control of the humidostat 72 to control the humidity effects of the circulating air. The humidostat 72 is connected by a conductor 73x with the return conductor 86.

If the refrigeration of the circulating air, thus produced by radiator 19 is not sufficient to establish compensation, the thermostatic device 80 continues the production of a clockwise movement of the shaft 83 so that contacts are established to deliver current from conductor 84 into conductor 91, through the controlling device 77, for starting the motor driven pump 50, which then operates to cause a greater movement of water through the radiator 19 and increase the cooling effect.

Figure 11:
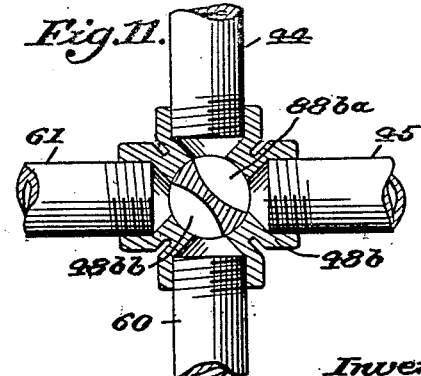
Fig. 11 is a detail view, on a large scale, of the valve 48b.

It will be understood that these two cooling operations have been accomplished without evaporation of liquid refrigerant in the evaporator 37. The energization of the pumps 42 and 50, in conjunction with the proper positioning of the valves 48a and 48b serve for effecting small changes in the temperature conditions of the cycling air by the water circulation system only. If greater demands for cooling occur, or if the refrigerating effect of the water alone is exhausted, the thermostatic device 80 causes a yet further clockwise movement of the shaft 83 so that contacts are established for the passage of current from conductor 84a by branch conductor 87a and thus to terminal 88a of the electrically operated device 89a, with a return by conductor 90a to conductor 86 thus effecting movement in four-way valve 48a, and causing water to flow from the pump 42 through conduits 43 and 44, valve 48b, conduit 45, condenser 32 and conduit 46, direct to conduit 51 and cooling tower (or waste). Water from the pump 50 flows through radiator 19, conduits 60 and 61, evaporator 37, and returns to the pump 50 by conduits 47 and 49. It is preferred to place a small bleeder hole 48ba in the gate 48bb of valve 48b (see Fig. 11) so as to maintain full volume of water in the above circuit and compensate for any water losses from the circuit or change in volume of water. Contacts are also established for passage of current from conductor 84 by conductor 92 to the control device 93a of the compressor 30 so that this compressor means operates at a fraction of its total capacity and thus serves to withdraw refrigerant gas from the evaporator 37 and force it into the condenser 32 so that liquefaction occurs in the usual way and the refrigerating plant operates at a small fraction of its capacity. The evaporation of liquid refrigerant at the evaporator 37 now occasions a cooling of the water, so that water colder than before is now delivered by conduit 47 into the radiator 19. If this is insufficient, the thermostatic device continues in producing a clockwise movement of shaft 83 so that successively contacts are established for the passage of current from conductor 84 to conductors 94 and 95 so that the control devices 93b, 93c are successively energized. As will be noted hereinafter from the description of Fig. 9, the making of the contacts to conductors 92, 94 and 95 are successive, but each conductor remains charged so that in succession there is a charging of conductor 92, of conductors 92 and 94, and finally of conductors 92, 94 and 95. In consonance therewith, the compressor means is controlled by the device 93a for a small fraction of the total output, by devices 93a and 93b for a major portion of the output, or by devices 93a, 93b and 93c for causing operation at maximum capacity. The particular construction and arrangement of the variable compressor or multiplicity of compressors by which such effects may be gained, may be of any type; and devices of this nature are already known in the art and their details form no part of the present invention.

Thus it will be seen that if the air passing from the apartment 10 is at a temperature above that which has been established as normal, successively graded cooling effects are attained for chilling this air to bring it to a normal condition.

If the air which was too hot, is being made cooler by the action of the automatic control as described above, then as the cooling progresses the thermostatic device 80 causes a return movement of the shaft 83 in a counter-clockwise direction toward normal, thus successively cutting off the circuits in inverse order and reversing the valve 48a so that normally a balance is automatically maintained in the device.

If, on the other hand, the air from apartment 10 is colder than the standard which has been set as normal for the apartment, then the thermostatic device 80 tends to produce a rocking of the shaft 83 in a counter-clockwise direction past the central or "standard temperature" position of this shaft. On passing this central position, the contact which controls conductor 87b is interrupted. Contacts which control conductors 85 and 91 are also interrupted, and then contacted again in turn causing pumps 42 and 50 to start again.

Further counter-clockwise movement past this central position, of shaft 83, causes a contact to be established for the passage of current from conductor 84a to conductor 100b and thus to the terminal 101b of the electrically operated device 89b, with a return by conductor 86. The electrically operated device 89b now reverses the position of the four-way valve 48b. A flow of warm water now occurs from the condenser 32 by conduits 46, four-way valve 48a, conduit 49, pump 50, radiator 19, conduit 60, four-way valve 48b, conduit 45, and back to the condenser 32. As before, this circuit is charged with water, and hence very little water enters through bleeder hole 48ba in valve 48b from the supply conduit 43. A heating occurs in radiator 19 and the air in apartment 10 tends to become warmer. If this is insufficient for returning the air of the apartment to a normal or standard condition, the thermostatic device 80 causes further counter-clockwise movement of the shaft 83, so that in succession, as before, contacts are established for the passage of current from conductor 84 to conductors 92, 94 and 95. Conductors 92, 94 and 95 serve as before for controlling the action of the variable compressors 30. With the prevailing position of the four-way valves 48a and 48b, however, the condenser is delivering warm water to the radiator 19. Hence the action of pump 42 is to provoke a circulation through the supply pipe 43; the action of pump 50 is to cause a greater circulation of water between the radiator and condenser; and the action of the compressor is to deliver more or less hot refrigerant gas to the condenser 32 for heating the water moving therethrough.

When the air in the apartment 10 becomes warmer, the thermostatic device 80 rocks the shaft 83 backward in a clockwise direction toward the normal, standard or central position thereof, cutting off circuits in inverse order, so that the heating effect obtained maintains normal temperature conditions in apartment 10.

When the compressors 30 are in operation during the cooling cycle described above, the positioning of the four-way valves 48a and 48b has also caused water from the supply pipe 43 to pass through conduits 44 and 45, the condenser 32, and by pipe 46 to the four-way valve 48a and thence by pipe 51 to the cooling tower 52, for example, and thence back by pipe 54 to the pump 42. A circulation of cooling water for heat disposal is thus established through the condenser so that the hot gases from conduit 31 are liquefied and the liquid delivered to the receiver 34. It is obvious that this cooling water may be taken from main 40 if so desired, and may be wasted in whole or part by conduit 57. The source, cycling, and disposal of this water will be determined by local conditions of temperature, availability and cost.

During this cooling cycle, the charging of conductor 87a also causes current to flow through conductor 73h to the valve control 75 for the valve 76, thus effecting a control of humidity according to the operation of the humidostat 72. The valve 70 is constructed so that, when de-energized, it comes into and holds a closed position; and the valve 76 is so constructed that when de-energized it comes into and holds an open position. The de-energization of conductor 109a has also open-circuited conductor 73c so that the valve device 71 closes its valve. Similarly, it will be noted that a deenergization of conductor 73h will cause device 75 to open the valve 76 and then this valve 76 will stand open regardless of the movement of humidostat 72. In other words, the movements by control devices 71 and 75 are alternated according to whether cooling or heating is being produced, and according to whether the humidity control is to be accomplished by increasing or decreasing the amount of water contained in the air.

During the aforesaid heating cycle, the positioning of the valves 48a and 48b causes the water from main 43 to flow through conduit 61 to evaporator 37 and thence by conduit 47 to the four-way valve 48a and by conduit 51 to the water tower 52 which now operates for relatively heating this water. As before, the water may be taken from the main 40, and it may be wasted through conduit 57 if so desired. When compressors 30 are in operation, the action of this portion of the system is to effect an evaporation of the liquid refrigerant at evaporator 37 and thus to abstract the heat from the water passing through the cooler so that a proper supply of refrigerant gas of higher heat content is delivered to the compressor 30 and this heat in addition to the mechanical energy of the compressor may be employed for developing the heat to be delivered at condenser 32 and thence to radiator 19 for heating the circulating air in the apartment.

Under both conditions of operation, it will be noted that the pressure of water at the supply pipe 43 is sufficient to prevent passage of water through bleeder hole 48ba in valve 48b from conduit 60 to conduit 45 during a cooling cycle, and from conduit 60 to conduit 61 during a heating cycle.

In order to increase the efficiency when operating, especially during quiescent periods of the compressor 30, or when the compressor is omitted or shut down, it is preferred also to provide means for supplying water direct to the pre-conditioning coil 22. In the form illustrated in Fig. 1, a time clock TC is shown as controlling a circuit by branch conductor 84b through the solenoid RC of a relay TR, with a return by a conductor 86, during certain times of the day as controlled by the said clock TC. When the solenoid RC is energized, a relay TR is closed for energizing the extended portion of conductor 84 and thus producing the energization of the motor 13 for the fan 12, as well as the energization of the several circuits leading to the pumps 42 and 50, and to the compressor 30; and in addition to the humidity control device 72.

This form shown in Fig. 1 permits utilizing the water from the tower for maintaining constancy of temperature within the apartment, when the temperature of this water is nearer the desired apartment temperature than the temperature of the air upon recycling, or the temperature of the fresh entering air. Assuming that the normal water supply at the pump 42 is around 70 degrees and that this is about the temperature at which it is desirable to maintain the apartment 10, then as the outside temperature conditions rise, the temperature in the apartment 10 will naturally rise also to a greater or lesser extent. As the incoming air is delivered by fan 21 to the preliminary cooling coil 22, a flow of this water through such coil tends to reduce the temperature of the fresh make-up air to around 70 degrees, and the warmer the outside atmosphere, the greater will be the cooling effect at the coil 22. Conversely, if the outer air becomes colder than 70 degrees, this supply of water at a substantially steady temperature of 70 degrees at the pump 42 will result in a heating of the make-up air toward the desired temperature, and the colder the outside air, the greater the heating effect thus produced. Further, it will be noted that cold water from the evaporator or warm water from the condenser or another source thereof may be utilized to temper the water supply to maintain it at the desired level for accomplishing such purposes upon the entering make-up air.

In the modified form of construction shown in Fig. 2, the condenser 32 and evaporator 37 are shown conventionally, while the other parts and connections in the refrigerating system have been omitted. Fig. 2 is further conventionalized in showing the radiator 19 as having the supply conduit 49 and the discharge conduit 44, while the main water supply pipe 43 leading from the pump 42 leads to a manifold pipe 45 connected to both the condenser 32 and the evaporator 37. The pipe 46 from the condenser and the pipe 47 from the evaporator lead to a four-way valve 48a which is also connected with the conduit 49 and the waste pipe 51 which leads to a drain or to the water tower as indicated for Fig. 1. It will be noted that the conduit 44 also opens into the waste pipe 51.

This arrangement of the parts is particularly advantageous when a large volume of water is available for use. When the four-way valve 48a is in position to establish communication from conduit 47 to conduit 49, and from conduit 46 to waste pipe 51, a cooling cycle is provided. The cooling effect produced in the evaporator 37 is employed for chilling water coming from supply pipe 43 by manifold 45, and this cooled water passes by conduit 49 into the radiator for cooling the circulating air in the manner set out with respect to Fig. 1. The warm water from the radiator 19 passes by conduit 44 to the waste pipe 51, and thence to the drain or cooling tower. On the other hand, the condenser 32 is maintained effective by the movement of water from the supply pipe 43, through manifold 45, the condenser 32, conduit 46, four-way valve 48a, and thence away by the waste pipe 51. The two paths for water are thus connected in multiple during the cooling cycle.

When the four-way valve 48a of Fig. 2 is moved to position for connecting conduit 46 with conduit 49, and conduit 47 with conduit 51, the apparatus is in position for a heating cycle with a large volume of water. Warm water then flows from the condenser 32 by conduit 46, valve 48a, pipe 49, the radiator 19, and is discharged by conduit 44 to the drain pipe 51. The cold water produced in the evaporator 37 is delivered by conduit 47 to the waste pipe 51. Make-up water for the condenser and the evaporator is supplied from the pipe 43 by manifold 45, again in multiple.

Such an arrangement is particularly advantageous when the large volume of water is available at only a low head, as the multiple connection avoids high frictional losses.

In the form shown in Fig. 3, the arrangement of parts of the refrigerating plant is the same as in Fig. 1. This modification is also particularly adaptable for heating and cooling effects when a large volume of supply water is available at a low head from the pump 42 or other source. The condenser and evaporator are therefore supplied in multiple to avoid frictional losses. Water from the source 42 passes by supply pipe 43 and the manifold pipe 45 into both the condenser 32 and the evaporator 37.

For the cooling cycle in Fig. 3, the three-way valve 48b is placed in position for the passage of water from the condenser 32 by pipe 46, branch pipe 46b, three-way valve 48b to the waste pipe 51. The water from manifold 45 enters the evaporator 37 and is cooled therein, and then passes by pipe 47 and through the check valve 63a into pipe 49 and thus to the radiator 19; and leaves the radiator by pipe 44 and passes to the discharge pipe 51. It will be noted that the check valve 62a operates to prevent cold water from passing into the pipe 46.

During the heating cycle for the modification shown in Fig. 3, the three-way valve is set to establish communication so that the water entering the evaporator 37 from manifold pipe 45 is discharged by pipe 47 and its branch 47a, through the three-way valve 48b, to the waste pipe 51. Three-way valve 48b closes the pipe 46b. Water entering the condenser 32 from the manifold 45 is heated in the condenser and makes its exit by pipe 46, through the check valve 62a, and by pipe 49 to the radiator 19, from which it escapes by pipe 44 to the waste pipe 51.

In the modification shown in Fig. 4, the refrigerating plant is disposed as before, and the supply from the source (illustrated as a pump 42) is assumed to comprise a relatively limited volume of water. This water passes by the supply pipe 43 to a first four-way valve 48c, while the water is ultimately released from the evaporator or condenser by a second four-way valve 48d to the waste pipe 51 as before. For the cooling cycle, the water from supply pipe 43 passes to the valve 48c and thence by conduit 45a to the evaporator 37, departing by conduit 47 and valve 48d, so that it passes through pipe 49 into the radiator 19 and escapes therefrom by conduit 44, valve 48c, conduit 45b, condenser 32, pipe 46, valve 48d and thus to the waste pipe 51. It will be noted that the water moves in series flow from the supply, through the evaporator, radiator, condenser, and thus to the waste pipe.

For the heating cycle with the form shown in Fig. 4, the valves 48c and 48d are reversed. Water now flows from supply pipe 43, by valve 48c, pipe 45b, condenser 32 for the heating effect, pipe 46, valve 48d, pipe 49, the radiator 19, pipe 44, valve 48c, pipe 45a, the evaporator 37, pipe 47, valve 48d, to the waste pipe 51. It will be noted that here also there is a series flow from the source through the condenser, the radiator, the evaporator, and to the waste.

In the form of construction shown at Fig. 5, a flow is provided for the movement of a supply of water received at a relatively cold temperature when pump 42 receives its supply from an outside source such as, for instance, a well. The parts of the refrigerating plant proper are as in Fig. 1 and include the condenser 32 and the evaporator 37 as before. The source of water 42 is connected by the supply pipe 43 with a proportioning valve 76. During the cooling cycle the thermostatic control equipment will previously have acted to close automatic valve 48f and open automatic valve 48g. Valve 76 divides the water, a portion passing by conduit 45c, through evaporator 37, conduit 47, check valve 63c, conduit 49, radiator 19, conduits 44–46d, valve 48g and conduit 51 to waste, the remaining portion passing through conduit 45, condenser 32 and conduits 46, 46c to waste. Valve 76 is controlled by humidostat 72 and serves to throttle the flow of water through evaporator 37, causing a smaller volume of water to be cooled through a greater range of temperature, to leave the evaporator at a lower temperature, and to have a greater dehumidifying effect on the circulated air.

During the heating cycle thermostatic control equipment will previously have acted to open automatic valve 48f, close valve 48g and start pump 50a. No dehumidification being required, valve 76 will divert all water through conduit 45c, evaporator 37, conduits 47 and 47c, valve 48f and conduit 51 to waste. Water from pump 50a passes through conduit 49, radiator 19, conduit 44, check valve 63b, conduit 45d, condenser 32 and returns to the pump 50a by conduit 46 and check valve 62c.

With this form of construction, advantage is taken of the relatively cold temperature of the available supply water when cooling, since the colder water, the smaller the range through which it must be mechanically cooled to reach the temperature required by the radiator. It is obvious that by reversing (with reference to the evaporator and condenser) the form of valving shown at Fig. 5, advantage may be taken of a relatively warm water in heating.

In the form of construction shown in Fig. 6, the arrangement is particularly adapted for use with a supply of water at a temperature of between sixty and seventy degrees, i. e., water which is cooler than the temperature usually available at summer conditions. The diagram is conventionalized to indicate the evaporator 37 and condenser 32 of a refrigerating plant such as that shown in Fig. 1. The source of water 42 is connected by a conduit 43 with the inlet for the evaporator 37.

During the cooling cycle, the cold supply water is passed through the evaporator and then moves by conduit 47 through the check valve 63e and pipe 49 to the radiator 19, from which it escapes by pipe 44b into the condenser 32, which it leaves by conduit 46 and branch conduit 46c to enter the waste pipe 51. The check valve 62e does not permit flow toward the pump 50a, as the conduit sections between the two check valves 62e and 63e are already full of water. Thus, the cold water is further chilled in the evaporator, utilized in the radiator, and then used in the condenser. It will be understood that the valve 48h is maintained closed during the cooling cycle.

For the heating cycle with the cold water, the valve 48h is opened and the circulating pump 50a is started. Water now flows from the supply 43 through the evaporator 37 and is discharged by the pipe 47 and its branch 47e, valve 48h, to the waste pipe 51. A continuous circulation of water is established from the radiator 19 by pipe 44b, condenser 32, pipe 46, check valve 62e, pump 50a, pipe 49 (check valve 63e preventing movement of this water into pipe 47), and thus back to the radiator 19, so that the heating effect at the condenser is transmitted to the radiator 19. If water is lost from this system, water can enter it by reverse flow through the check valve 63e or by flow through the pipe 46c.

In the modification shown in Fig. 7, it is assumed that the supply of water is at a temperature of say eighty or ninety degrees; i. e., at a temperature above that which is preferred for the apartment to be heated or cooled. The evaporator 37 and condenser 32 are shown conventionally as before. This warm water is delivered from the source 42 by supply pipe 43 into the condenser 32.

During the cooling cycle for the form shown in Fig. 7, the valve 48k is open and the circulating pump 50b is operating. The warm water from supply pipe 43 is further heated in the condenser 32 and then passes by conduit 46 and valve 48k to the drain pipe 51. A circulation of water is also set up from the radiator 19 by pipe 44c into the evaporator 37, with a return by pipe 47, check valve 63f, circulating pump 50b, and pipe 49. The check valve 62f prevents this cold water from passing into pipe 46 and thus to the drain pipe 51. The circulating pump 50b assures that the cold water leaving the evaporator 37 will go to the radiator 19 and not pass through the branch pipe 47f, while permitting utilization of pressures to make up loss of water from the circulation, or change of volume of this water to take place.

The heating cycle for the arrangement of Fig. 7 occurs when the circulating pump 50b is stopped and the valve 48k is closed. Water now flows from the supply pipe 43 and is further heated at the condenser 32 and passes by pipe 46, check valve 62f, pipe 49, the radiator 19, pipe 44c, evaporator 37, and by pipes 47 and 47f to the waste pipe 51.

In these various forms of construction and arrangement, it will be noted that the evaporator of a refrigerating plant is employed during the cooling cycle as a source of cold for chilling the circulating medium which is transmitted through a radiator for modifying the temperature condition of air in an apartment, and preferably by forcible circulation of air to and from this apartment. Similarly, the condenser of this refrigerating plant is used during heating cycles for heating the circulating medium delivered to this radiator. Furthermore, during the cooling cycle, the condenser is effectively used to dissipate the heat picked up at the evaporator and to produce the refrigerant in liquid condition for employment in the evaporator: and, conversely, during the heating cycle, the evaporator is employed for recovering the desired heat from the water and providing the refrigerant gas which when additionally heated by compression delivers necessary heat units at the condenser. Thus, the plant operates by the transfer of heat to or from the water and the conversion of mechanical energy at the compressor, to effect a cooling or heating of the said radiator.

In the preferred forms of construction, a conduit system is provided for the circulating medium in such a manner that this medium flows through the evaporator, through the condenser, and through the radiator always in the same direction: although its path external to these elements may be changed in various ways according to the conditions of the supply of cooling water or other like medium, with respect to the quantity and temperature thereof.

Further, the system provides automatic means for effecting the results desired.

Figure 8:
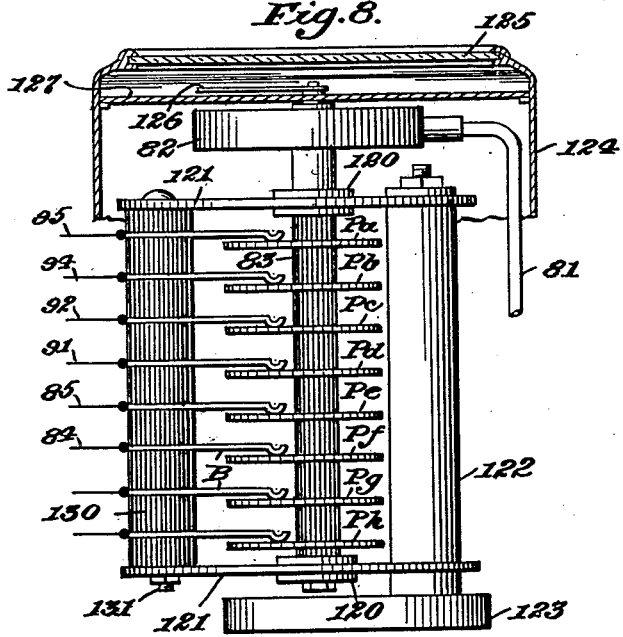
Fig. 8 is a detail view, on a much larger scale, showing a type of thermostat contact device which may be employed with the plant shown in Fig. 1 for automatically controlling the operation thereof.
Figure 10:
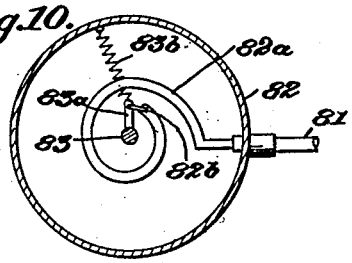
Fig. 10 is a conventionalized sectional view of the actuator structure for the contact device of Figs. 8 and 9.

The conventional showing of the thermostatically operated control in Fig. 1 may be accomplished by the specific type of apparatus set out in Figs. 8, 9 and 10. The thermostatic structure 82 (Figs. 1, 8 and 10) is provided with a Bourdon tube 82a connected to the conduit 81. This tube at its free end is connected, as by a link 82b, to the arm 83a of the shaft 83; and thus tends to rock the shaft against the action of the spring 83b during periods of increasing pressure in the conduit 81, and to permit the spring 83b to return the shaft during periods of decreasing pressure, in the usual way. This shaft 83 is mounted by bearings 120 (Fig. 8) on the plates 121 of a frame which includes the pillar means 122 supported by a fixed base 123. The entire structure may be enclosed by a casing 124 having a vision window 125 of glass for permitting inspection of the indicating hand 126 fixed to the shaft 83, and which plays over a dial 127.

The shaft 83 supports a plurality of plates Pa, Pb, Pc, Pd, Pe, Pf, Pg, Ph which are illustrated in Fig. 8 as formed of insulating material and having contact sectors of different shapes thereon. The plates Pa, Pb, Pc, Pd, Pe, Pf each have a brush B connected in circuit, as illustrated and described hereinafter; while the plates Pg and Ph have three such brushes and the contact sectors thereof permit selective engagement of two of these brushes in accordance with the direction of rocking imparted to the shaft 83. The conductor 84 is joined to a brush which rests on plate Pf on the conductor sector of plate Pf, and thus establishes electrical conduction with the contact sectors of plates Pa, Pb, Pc, Pd, Pe. Plate Pa has the contact portion or sector of greatest inclined angle between its two arms and thus provides the contacts leading to conductor 95. Plate Pb has a smaller angle between its arms and provides the contacts connected with conductor 94. Likewise, the contact portion of plate Pc has a still smaller angle and cooperates for establishing contact to the conductor 92. The next smaller contact sector (on plate Pd) establishes contact for the conductor 91: while the one having the smallest angle between its two legs i. e. on plate Pe, establishes contact for conductor 85. It will be noted that the construction and arrangement is such that when one of these contacts has been established, this contact continues throughout the further angular movement of the shaft 83. In other words, when contact has once been made at plate Pe to conductor 85, this continues during a further movement of the shaft 83 in the same direction.

The sectors Pg and Ph have inner and outer contact portions which are spaced apart at the "rest" position corresponding to the position normally maintained when the apartment is at the desired temperature, so that no contact is then established to conductors 87a, 87b, 100a, 100b, whereas the conductor 84a is always in electrical relation with each of the contact sectors Pg and Ph on plate Pg. The purpose and result of this arrangement has already been described with respect to Fig. 1.

In this illustrated form, the electrical relation between the several conductors and the contact sectors is established by means of brushes B, which, as shown in Fig. 8, are insulated from one another and supported between the plates 121 by the insulating bushings 130 which are assembled on the bolt 131 passing between and through these plates.

It will be understood, however, that this is an illustrative form of utilizing the temperature conditions for automatically producing a control of the operating plate.

While several modified forms have been shown, it will be understood that these are not the sole forms possible of employment, but that the invention may be practiced in many ways within the scope of the appended claims.

I claim:

1. An air conditioning system comprising a radiator exposed to the air to be conditioned, a refrigerating plant including a condenser and an evaporator, a water inlet, a water outlet, and conduit means connecting said condenser, evaporator, radiator, water inlet and water outlet and including valving means for selectively directing water flow through said radiator from said condenser or evaporator accordingly as the air is to be respectively heated or cooled and establishing a flow from said evaporator or condenser to said outlet, for respectively adding heat to or absorbing heat from the refrigerating plant.

2. An air conditioning system comprising a radiator exposed to the air to be conditioned, a refrigerating plant including a condenser and an evaporator, a water inlet, a water outlet, conduit means connecting said condenser, evaporator, radiator, water inlet and water outlet and including valving means for selectively directing water flow through said radiator from said condenser or evaporator accordingly as the air is to be respectively heated or cooled and establishing a flow from said evaporator or condenser to said outlet for respectively adding heat to or absorbing heat from the refrigerating plant, and control devices responsive to the temperature of the air being conditioned for moving said valving means.

3. An air conditioning system comprising a radiator exposed to the air to be conditioned, a refrigerating plant including a condenser and an evaporator, a water inlet, a water outlet, conduit means connecting said condenser, evaporator, radiator, water inlet and water outlet and including valving means for selectively directing water flow through said radiator from said condenser or evaporator accordingly as the air is to be respectively heated or cooled and establishing a flow from said inlet through said evaporator or condenser to said outlet for respectively adding heat to or absorbing heat from the refrigerating plant, and control devices responsive to the temperature of the air being conditioned for controlling the flow of water from said inlet to said outlet.

4. An air conditioning system comprising a radiator exposed to the air to be conditioned, a refrigerating plant including a condenser and an evaporator, a water inlet, a water outlet, conduit means connecting said condenser, evaporator, radiator, water inlet and water outlet and including valving means for selectively directing water flow through said radiator from said condenser or evaporator accordingly as the air is to be respectively heated or cooled and establishing a flow from said inlet through said evaporator or condenser to said outlet for respectively adding heat to or absorbing heat from the refrigerating plant, water circulating means connected with said radiator for producing a flow therethrough, and control devices responsive to the temperature of the air being conditioned for determining the actuation of said circulating means.

5. An air conditioning system comprising a radiator exposed to the air to be conditioned, a refrigerating plant including a condenser, an evaporator, and a compresser of variable capacity, a water inlet, a water outlet, conduit means connecting said condenser, evaporator, radiator, water inlet and water outlet and including valving means for selectively directing water flow through said radiator from said condenser or evaporator accordingly as the air is to be respectively heated or cooled, and establishing a flow from said inlet through said evaporator or condenser to said outlet for respectively adding heat to or absorbing heat from the refrigerating plant, and control devices responsive to the temperature of the air being conditioned for varying the capacity of said compressor.

6. An air conditioning system comprising a radiator exposed to the air to be conditioned, a refrigerating plant including a condenser, an evaporator, and a compressor of variable capacity, a water inlet, a water outlet, conduit means connecting said condenser, evaporator, radiator, water inlet and water outlet and including valving means for selectively directing water flow through said radiator from said condenser or evaporator accordingly as the air is to be respectively heated or cooled and establishing a flow from said inlet through said evaporator or condenser to said outlet for respectively adding heat to or absorbing heat from the refrigerating plant, and control devices responsive to the temperature of the air being conditioned and operating firstly for moving said valving means accordingly as the air is to be heated or cooled and thereafter for varying the capacity of said compressor in accordance with the degree of heating or cooling effect necessary to be attained.

7. An air conditioning system comprising a radiator exposed to the air to be conditioned, a refrigerating plant including a condenser and an evaporator, a water inlet, a water outlet, conduit means connecting said condenser, evaporator, radiator, water inlet and water outlet and including valving means for selectively directing water flow through said radiator from said condenser or evaporator accordingly as the air is to be respectively heated or cooled and establishing a flow from said inlet through said evaporator or condenser to said outlet for respectively adding heat to or absorbing heat from the refrigerating plant, water spray means for projecting water into the air, and control devices responsive to the temperature and humidity of the air for controlling said spray means and the circulation of water through said radiator for regulating the humidity of the air.

8. An air conditioning system comprising a duct through which is circulated the air to be conditioned, a radiator in said duct, a refrigerating plant including a condenser and an evaporator, means for admitting fresh air into said duct so that it passes over said radiator, precooling means for modifying the fresh air before it passes to the radiator, spray means for introducing water into the fresh air, and control devices responsive to the humidity of the circulating air for varying the operation of said spray means and of said radiator, and control devices responsive to the temperature of the circulating air for selectively controlling the operation of the spray means and of the radiator, said latter devices including also means for varying the precooling effect at said precooling means.

9. An air conditioning system comprising a duct through which is circulated the air to be conditioned and having a duct inlet connection through which recirculating air enters the duct and also a fresh air duct inlet connection, a radiator in said duct, a refrigerating plant including a compressor and an evaporator, precooling means for modifying the fresh air before it passes to the radiator, spray means for introducing water into the air, control devices responsive to the humidity of the circulating air for varying the operation of said spray means and of said radiator, a water circulating pump for delivering water as a heat-exchange medium to said precooling means and also to said refrigerating plant and thence to the radiator, said pump being effective for delivering a substantially constant volume of water, and control devices responsive to the temperature of the recirculating air entering said duct and effective for selectively producing a passage of the water to the radiator from heat-exchange surfaces of the condenser or evaporator accordingly as the radiator is to heat or to cool the air to be conditioned, said latter control devices also being effective for controlling the operation of the spray means.

10. An air conditioning system comprising a radiator exposed to the air to be conditioned and having an inlet and an outlet, a refrigerating plant including a condenser and an evaporator, each of which has an inlet and an outlet, a source of a heat exchange medium of substantially fixed temperature, conduits and valving means for establishing paths of flow of the heat exchange medium from said source selectively from the condenser or the evaporator and along heat-exchange walls of the radiator to a discharge point for the medium, and operating to produce paths of flow along heat-exchange walls of the radiator and along heat-exchange walls of the condenser and evaporator always in the direction from the inlet to the outlet thereof, and means for controlling the heating and cooling effects of said condenser and evaporator.

11. An air conditioning system comprising a radiator exposed to the air to be conditioned, a water supply, separate means for heating and for cooling water from said supply and delivering the same to said radiator, and control devices responsive to the temperature of the air being conditioned and automatically effective upon demand for heating or cooling of the air to effect a selective connection of the radiator to the heating or to the cooling means, and for causing the flow of water from the supply toward the radiator, and thereafter being automatically effective to establish successively greater or lesser degrees of heating or cooling of the water passing to the radiator in accordance with the thermal conditioning demand of the air.

12. An air conditioning system for an apartment comprising an air duct for receiving air from and delivering air to the apartment, a radiator exposed to the air in said duct and means for cooling said radiator, a water spray means in said duct, means for moving air in a circuit including said duct, means for admitting fresh air to said duct, means for precooling fresh air admitted to said duct, means for discharging a part of the apartment air without passing it through said radiator, control devices responsive to the humidity of the circulating air for controlling the spray means and controlling devices responsive to the temperature of the air for varying the cooling effect at said radiator and for controlling said spray means, said latter devices including also means for varying the precooling effect at said precooling means.

13. An air conditioning system for an apartment comprising an air duct for receiving air from and delivering air to the apartment, a radiator exposed to the air in said duct and means selectively effective for heating and cooling said radiator, a water spray means in said duct, means for moving air in a circuit including said duct, means for admitting fresh air to said duct, means for precooling the fresh air admitted to said duct, means for discharging a part of the apartment air without passing it to said radiator, control devices responsive to the humidity of the circulating air for controlling the spray means, and control devices responsive to the temperature of the air for varying the thermal effect at said radiator and for controlling said spray means, said latter devices including also means for varying the precooling effect at said precooling means.

14. An air conditioning system comprising an air duct, a radiator exposed to the air in the duct, a refrigerating plant including a condenser and an evaporator, a water inlet, a water outlet, and conduit means connecting said condenser, evaporator, radiator, water inlet and water outlet and including valving means for selectively directing water flow from the inlet along heat-exchange walls of said elements and to said outlet for selectively producing heating or cooling effects at the radiator and including a substantially closed circuit from the radiator to said evaporator or condenser, and including a branch connection whereby make-up water may pass from the water inlet into said closed circuit.

15. An air conditioning system comprising an air duct, a radiator exposed to the air in said duct, a refrigerating plant including a condenser and an evaporator, a water inlet, a water outlet, and conduit means from said inlet to said outlet and extending along heat-exchange walls of the radiator, condenser and evaporator and including valving means for selectively directing the flow of water from the inlet along heat-exchange walls of the condenser to the radiator and thence to the evaporator when heating of the air is to be effected, and from the inlet along heat-exchange walls of the evaporator to the radiator and thence to the condenser when cooling is to be effected.

16. An air conditioning system comprising an air duct, a radiator exposed to the air in said duct, a refrigerating plant including a condenser and an evaporator, a water inlet, a water outlet, conduit means from said inlet to said outlet and extending along heat-exchange walls of the radiator, condenser and evaporator and including valving means for selectively directing the flow of water from the inlet along heat-exchange walls of the condenser to the radiator and thence to the evaporator when heating of the air is to be effected, and from the inlet along heat-exchange walls of the evaporator to the radiator and thence to the condenser when cooling is to be effected, and control devices responsive to the temperature of the air for moving said valving means.

17. An air conditioning system comprising an air duct, a radiator exposed to the air in said duct, a refrigerating plant including a condenser and an evaporator and a compressor of variable capacity, a water inlet, a water outlet; conduit means from said inlet to said outlet and extending along heat-exchange walls of the radiator, condenser and evaporator and including valving means for selectively directing the flow of water from the inlet along heat-exchange walls of the condenser to the radiator and thence to the evaporator when heating of the air is to be effected, and from the inlet along heat-exchange walls of the evaporator to the radiator and thence to the condenser when cooling is to be effected; and control devices responsive to the temperature of the air for first moving said valving means accordingly as the air is to be heated or cooled, and thereafter operating to control said variable compressor according to the degree of heating or cooling effects to be produced.

18. An air conditioning system comprising a radiator exposed to the air to be conditioned, a water inlet, a water outlet, a refrigerating plant including a condenser and an evaporator; conduits connecting the water inlet, water outlet, radiator, condenser and evaporator and including valving means for selectively directing water flow along heat-exchange walls of said radiator from said condenser or from said evaporator accordingly as the air is to be heated or cooled; and control devices responsive to the temperature of the air for permitting the flow of water from said inlet to the radiator without heating or cooling thereof and operating when heating or cooling of the air is demanded to initiate the operation of the refrigerating plant and the control of said valving means for producing the heating or cooling of water passing to the radiator.

19. An air conditioning system comprising a radiator exposed to the air to be conditioned, a refrigerating plant including an evaporator, a relatively cold water supply, a waste water outlet; conduit means for connecting said evaporator, radiator, cold water supply and water outlet, and means for establishing a flow of said cold water, first along heat-exchange walls of said evaporator and then along heat-exchange walls of said radiator in series and to said waste water outlet so that advantage is taken of the natural refrigerating effect of the cold water to reduce the mechanical refrigerating effect required from the refrigerating plant; and means responsive to the temperature in the space whose air is to be conditioned and effective for establishing a flow of water to the radiator and effective for energizing said establishing means for causing a flow of water to the radiator and for controlling the temperature of the flowing water.

20. An air conditioning system comprising a radiator exposed to the air to be conditioned, a refrigerating plant including a condenser, an evaporator, a relatively cold water supply, a waste water outlet, a recirculating pump, and conduit means connecting said condenser, evaporator, radiator, recirculating pump, cold water supply and water outlet; said conduit means including valving means for selectively directing water flow along heat-exchange walls of said radiator from said evaporator or condenser, accordingly as the air is to be cooled or heated, and when cooling, directing a flow from said cold water supply along heat-exchange walls of said evaporator and said radiator in series to said water outlet, and a flow from said cold water supply along heat exchange walls of said condenser to said water outlet, and when heating, directing a flow from said cold water supply along heat-exchange walls of said evaporator to said outlet and a recirculated flow from said recirculating pump along heat-exchange walls of said radiator and condenser in series with said pump.

21. An air conditioning system comprising a radiator exposed to the air to be conditioned, a refrigerating plant including a condenser, a relatively warm water supply, a waste water outlet; conduit means for connecting said condenser, radiator, warm water supply and water outlet, means for establishing a flow of said warm water, first along heat-exchange walls of said condenser and then along heat-exchange walls of said radiator in series and to said waste water outlet so that advantage is taken of the natural heating effect of the warm water to reduce the mechanical heating effect required from the refrigerating plant used in reverse cycle; and means responsive to the temperature in the space whose air is to be conditioned and effective for establishing a flow of water to the radiator and effective for energizing said establishing means for causing a flow of water to the radiator and for controlling the temperature of the flowing water.

22. An air conditioning system comprising a radiator exposed to the air to be conditioned, a refrigerating plant including a condenser and an evaporator, a relatively warm water supply, a waste water outlet, a recirculating pump; and conduit means for connecting said condenser, evaporator, radiator, recirculating pump, cold water supply and water outlet including valving means for selectively directing water flow along heat-exchange walls of said radiator from said condenser or evaporator, accordingly as the air is to be heated or cooled, and, when heating, directing a flow from said warm water supply along heat-exchange walls of said condenser and said radiator in series and to said water outlet, and a flow from said warm water supply along heat-exchange walls of said evaporator to said water outlet, and when cooling, directing a flow from said warm water supply along heat-exchange walls of said condenser to said water outlet and a recirculated flow from said recirculating pump along heat-exchange walls of said radiator and evaporator in series with said pump.

NORMAN H. GAY.